United States Patent
Chae et al.

(10) Patent No.: US 8,515,369 B2
(45) Date of Patent: Aug. 20, 2013

(54) APPARATUS AND METHOD FOR SELECTING TRANSMISSION MODE IN MULTI-ANTENNA SYSTEM

(75) Inventors: Heon-Ki Chae, Gyeonggi-do (KR); Keun-Chul Hwang, Gyeonggi-do (KR); Sung-Woo Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1129 days.

(21) Appl. No.: 12/012,673

(22) Filed: Feb. 5, 2008

(65) Prior Publication Data
US 2008/0188192 A1    Aug. 7, 2008

(30) Foreign Application Priority Data

Feb. 5, 2007  (KR) .................. 10-2007-0011490
Feb. 14, 2007 (KR) .................. 10-2007-0015196

(51) Int. Cl.
*H03D 7/16*    (2006.01)
(52) U.S. Cl.
USPC ........................ 455/131; 455/269; 455/101
(58) Field of Classification Search
USPC .............. 455/131–141, 269–279.1, 101
See application file for complete search history.

(56) References Cited

U.S. PATENT DOCUMENTS

| | | | |
|---|---|---|---|
| 5,898,927 A * | 4/1999 | Ishii et al. ..................... 455/450 |
| 7,283,499 B2 * | 10/2007 | Priotti et al. .................. 370/334 |
| 7,684,762 B2 * | 3/2010 | Ihm et al. ........................ 455/69 |
| 7,697,906 B2 * | 4/2010 | Himayat et al. ........... 455/127.1 |
| 7,778,147 B2 | 8/2010 | Forenza et al. |
| 8,416,872 B2 * | 4/2013 | Higuchi et al. ............... 375/267 |
| 2005/0237971 A1 * | 10/2005 | Skraparlis ..................... 370/329 |
| 2006/0083195 A1 | 4/2006 | Forenza et al. |
| 2006/0198460 A1 * | 9/2006 | Airy et al. ..................... 375/267 |
| 2008/0108310 A1 * | 5/2008 | Tong et al. ....................... 455/69 |

FOREIGN PATENT DOCUMENTS

| | | |
|---|---|---|
| KR | 1020060022630 A | 3/2006 |
| WO | WO 03/085876 A1 | 10/2003 |

* cited by examiner

*Primary Examiner* — Christian Hannon (57) ABSTRACT

An apparatus and a method for selecting a transmission mode in a multi-antenna system are provided. The method includes checking a channel characteristic of a transmitting end using a signal received over at least two antennas; and determining a multi-antenna transmission mode according to the channel characteristic. Accordingly, the loss of the system capacity gain can be reduced and the capacity gain of the system can be increased.

25 Claims, 11 Drawing Sheets

APPARATUS AND METHOD FOR SELECTING TRANSMISSION MODE IN MULTI-ANTENNA SYSTEM

CROSS-REFERENCE TO RELATED APPLICATION(S) AND CLAIM OF PRIORITY

The present application claims priority under 35 U.S.C. §119 (a) to an application filed in the Korean Intellectual Property Office on Feb. 5, 2007 and assigned Serial No. 2007-11490, and an application filed in the Korean Intellectual Property Office on Feb. 14, 2007 and assigned Serial No. 2007-15196, the disclosure of which is herein incorporated by reference.

TECHNICAL FIELD OF THE INVENTION

The present invention relates generally to a multi-antenna system. More particularly, the present invention relates to an apparatus and a method for selecting a transmission mode in the multi-antenna system.

BACKGROUND OF THE INVENTION

With the rapid growth of wireless mobile communication markets, various multimedia services are required in a wireless environment. To provide the multimedia services, researches are conducted on a multi-antenna (Multiple Input Multiple Output (MIMO)) system to efficiently utilize limited frequencies in response to mass data transmission and fast data transmission.

The multi-antenna system can increase a transmission reliability and a data rate, compared to a single-antenna system, by sending data over independent channels for the respective antennas without additional frequencies or transmit power allocation. For example, the multi-antenna system can enhance system performance through a diversity scheme and increase the data rate through a spatial multiplexing scheme.

When the spatial multiplexing scheme is used in the multi-antenna system, a transmitting end can increase the data rate by transmitting different data based on streams over transmitting antennas. A receiving end can reduce a gain by interference between the data received through the streams.

Hence, in the case of little interference between the streams, the multi-antenna system can increase a capacity gain using the spatial multiplexing scheme. However, in the case of considerable interference between the streams, the spatial multiplexing scheme may decrease the capacity gain due to the data interference. Accordingly, in the great interference between the streams, the multi-antenna system can acquire a stable link using the diversity scheme.

As discussed above, using the diversity scheme and the spatial multiplexing scheme, the multi-antenna system attains the gain which differs based on the channel environment. Therefore, the multi-antenna system demands a technique for selectively using the transmission mode based on the channel environment.

SUMMARY OF THE INVENTION

To address the above-discussed deficiencies of the prior art, it is a primary object of the present invention to substantially solve at least the above problems and/or disadvantages and to provide at least the advantages below. Accordingly, an aspect of the present invention is to provide an apparatus and a method for selectively using a multi-antenna transmission mode based on channel characteristics in a multi-antenna system.

Another aspect of the present invention is to provide an apparatus and a method for selectively using a multi-antenna transmission mode based on a Carrier to Interference and Noise Ratio (CINR) difference of transmit streams in a multi-antenna system.

Yet another aspect of the present invention is to provide an apparatus and a method for selectively using a multi-antenna transmission mode based on a CINR and a correlation of channels in a multi-antenna system.

Still another aspect of the present invention is to provide an apparatus and a method for selecting and feeding back a multi-antenna transmission mode based on channel characteristics at a receiving end of a multi-antenna system.

The above aspects are achieved by providing a method for selecting a transmission mode in a multi-antenna system. The method includes checking a channel characteristic of a transmitting end using a signal received over at least two antennas; and determining a multi-antenna transmission mode according to the channel characteristic.

According to one aspect of the present invention, a method for sending a signal in a multi-antenna system includes checking a multi-antenna transmitting mode determined by a receiving end, from a feedback signal received from the receiving end; and sending a signal to the receiving end in the multi-antenna transmission mode.

According to another aspect of the present invention, an apparatus for selecting a transmission mode in a multi-antenna system includes a receiver for receiving a signal over at least two antennas; a channel estimator for checking a channel characteristic of a transmitting end using the received signal; and a transmission mode determiner for determining a multi-antenna transmission mode according to the channel characteristic.

According to yet another aspect of the present invention, an apparatus for sending a signal in a multi-antenna system includes a feedback receiver for checking a multi-antenna transmission mode determined by a receiving end, from a feedback signal received from the receiving end; and a sender for sending a signal to the receiving end in the multi-antenna transmission mode over at least two antennas.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

The present invention provides a technique for selectively using a multi-antenna transmission mode according to channel characteristics in a multi-antenna system.

The multi-antenna system can determine the transmission mode according to characteristics of transmit streams and a channel condition of the channel characteristics.

To determine the transmission mode by considering the characteristics of the transmit streams, the multi-antenna system takes into account a Carrier to Interference and Noise Ratio (CINR) difference and an average CINR of the transmit streams. Herein, the transmit stream is a flow carrying a signal from a transmitting end via transmitting antennas.

When the multi-antenna system adopts the spatial multiplexing scheme, the transmitting end uses the same Modulation and Coding Scheme (MCS) level in the transmitting antennas. In doing so, when the CINR difference of the transmit streams is quite great, the capacity gain of the multi-antenna system is lowered. For example, when the transmitting end of the multi-antenna system sends a signal using the spatial multiplexing scheme via two antennas which have a stream 1 of the CINR 10 dB and a stream 2 of the CINR 17 dB, the average CINR of the streams is 12.74 dB. Thus, the transmitting end sends the signal at the MSC level based on the average CINR 12.74 dB. In this situation, the multi-antenna system cannot acquire the capacity gain in the spatial multiplexing scheme because the error probability in the signal transmitted using the stream 1 increases and the capacity of the stream 2 decreases.

For example, when the transmitting end of the multi-antenna system sends a signal using the spatial multiplexing scheme via two antennas which have a stream 1 of the CINR −4 dB and a stream 2 of the CINR 30 dB, the average CINR of the streams is 22 dB. Thus, the transmitting end sends the signal at the MSC level based on the average CINR 22 dB. In this situation, the multi-antenna system cannot transmit the signal through the stream 1 and thus cannot use the spatial multiplexing scheme.

Figure 1:
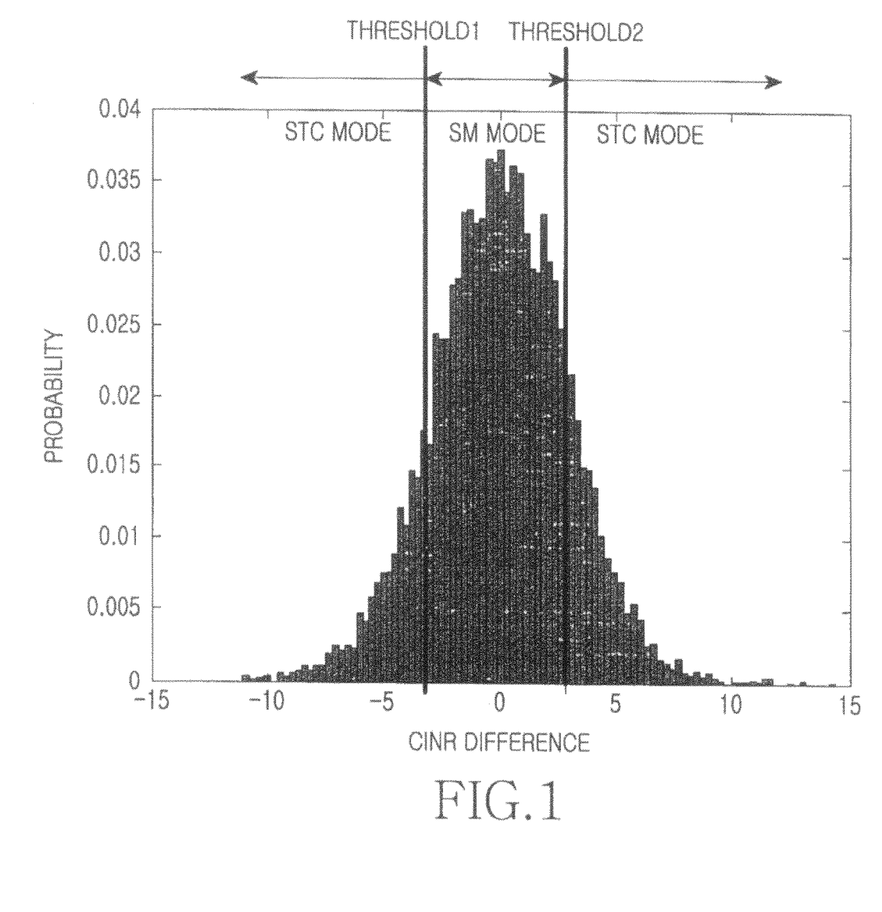
FIG. 1 is a graph of CINRs of transmit streams in a multi-antenna system according to an embodiment of the present invention.

Therefore, the multi-antenna system determines the transmission mode according to the CINR difference of the transmit streams as shown in FIG. 1.

FIG. 1 is a graph of CINRs of the transmit streams in a multi-antenna system according to an embodiment of the present invention.

When an absolute value of the CINR difference of the transmit streams is smaller than thresholds, the multiple-antenna system uses the spatial multiplexing mode. When the absolute value of the CINR difference of the transmit streams is greater than the thresholds, the multi-antenna system uses the diversity mode.

Figure 2:
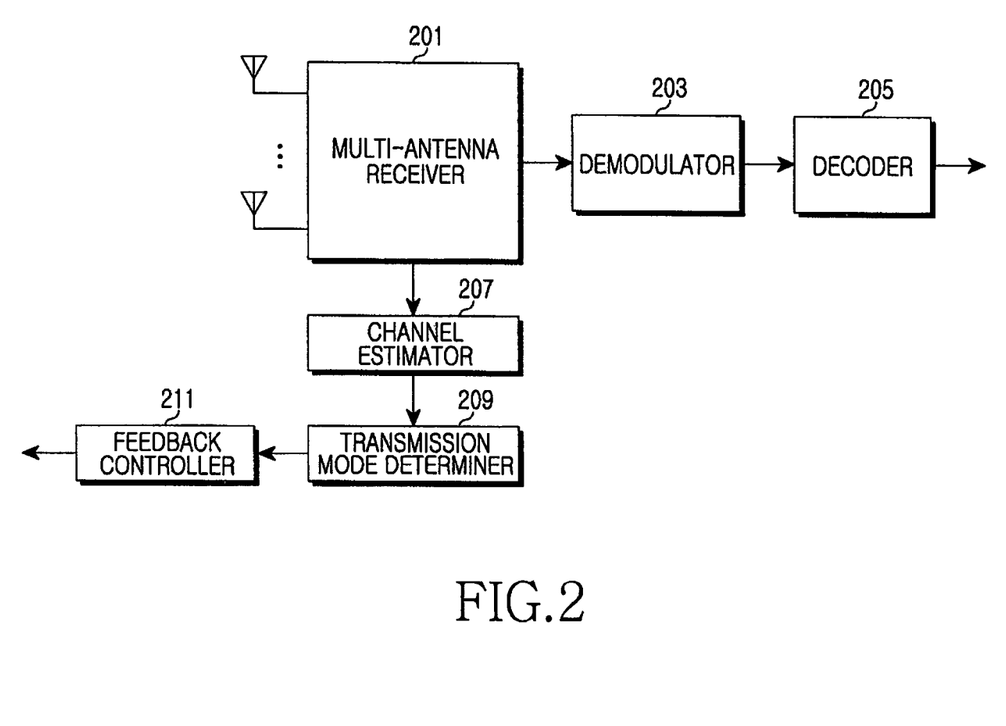
FIG. 2 is a block diagram of a terminal in the multi-antenna system according to an embodiment of the present invention.

When the transmission mode is determined based on the CINR difference of the transmit streams as above, a receiving end is constituted as shown in FIG. 2 to determine the transmission mode. Herein, the receiving end is a terminal by way of example.

FIG. 2 is a block diagram of a terminal in the multi-antenna' system according to an embodiment of the present invention.

The terminal of FIG. 2 includes a multi-antenna receiver 201, a demodulator 203, a decoder 205, a channel estimator 207, a transmission mode determiner 209, and a feedback controller 211.

The multi-antenna receiver 201 detects receive information from a signal received via antennas according to the transmission mode of the signal from the transmitting end (e.g., base station). For instance, when the base station sends a signal using the diversity mode, the multi-antenna receiver 201 detects a receive signal using the diversity mode. When the base station sends a signal using the spatial multiplexing mode, the multi-antenna receiver 201 detects a receive signal using the spatial multiplexing mode.

The demodulator 203 demodulates the receive signal provided from the multi-antenna receiver 201 at a corresponding modulation level (e.g., MCS level). The decoder 205 decodes the demodulated signal output from the demodulator 203 according to the corresponding modulation level.

The channel estimator 207 calculates CINRs of transmit streams detected at the multi-antenna receiver 201 and an average CINR of the transmit streams. For example, for two transmit streams, the channel estimator 207 calculates CINRs of the transmit streams and an average CINR of the transmit streams using Equation 1:

$$CINR_1 = \frac{|H_1 W_1|^2}{|H_2 W_1|^2 + \sum_{i=1}^{interference} (|H_1^i W_1|^2 + |H_2^i W_1|^2) + \sigma^2 \|W_1\|^2} \quad \text{[Eqn. 1]}$$

$$CINR_2 = \frac{|H_2 W_2|^2}{|H_1 W_2|^2 + \sum_{i=1}^{interference} (|H_1^i W_2|^2 + |H_2^i W_2|^2) + \sigma^2 \|W_2\|^2}$$

$$CINR_{AVR} = \sqrt{(CINR_1 + 1)(CINR_2 + 1)} - 1,$$

where $$H_1 = \lfloor h_s^{11} \quad h_s^{12} \rfloor, H_2 = \lfloor h_s^{21} \quad h_s^{22} \rfloor$$

$$W_1 = \begin{bmatrix} w^{1,stream1} \\ w^{2,stream1} \end{bmatrix}, W = \begin{bmatrix} w^{1,stream2} \\ w^{2,stream2} \end{bmatrix}.$$

In Equation 1, $CINR_i$ indicates a CINR of the i-th transmit stream, and $CINR_{AVR}$ indicates an average CINR of the transmit streams using the spatial multiplexing mode. $H_i$ indicates a channel of the i-th transmit stream and $W_i$ indicates a weight of the i-th transmit stream.

The transmission mode determiner 209 determines a multi-antenna transmission mode to be requested to the transmitting end using the CINRs and the average CINR of the transmit streams provided from the channel estimator 207. For example, when the CINR difference of the transmit streams is greater than a first threshold, the transmission mode determiner 209 selects the diversity scheme as the transmission mode. When the CINR difference of the transmit streams is smaller than or equal to the first threshold, the transmission mode determiner 209 selects the spatial multiplexing mode.

When the average CINR of the transmit streams is smaller than or equal to a second threshold, the transmission mode determiner 209 selects the diversity scheme as the transmission mode. When the average CINR of the transmit streams is greater than the second threshold, the transmission mode determiner 209 selects the spatial multiplexing mode.

The feedback controller 211 feeds back the multi-antenna transmission mode determined at the transmission mode determiner 209 to the transmitting end.

Now, a method for feeding back the multi-antenna transmission mode at the receiving end is explained.

Figure 3:
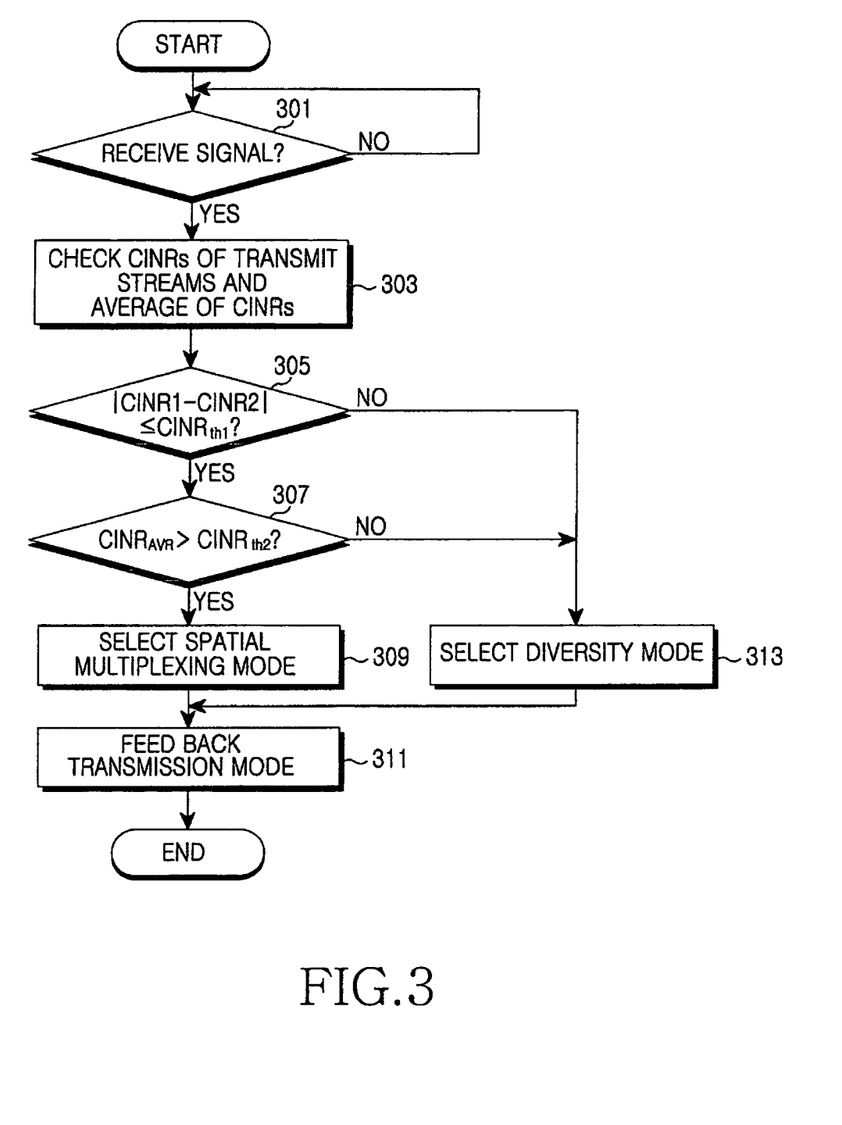
FIG. 3 is a flowchart of operations of the terminal in the multi-antenna system according to an embodiment of the present invention.

FIG. 3 is a flowchart of operations of the terminal in the multi-antenna system according to an embodiment of the present invention.

In step 301, the terminal checks whether a signal is received from the transmitting end via a plurality of antennas.

Upon receiving the signal, the terminal measures the CINRs of the transmit streams using the receive signal in step 303. Also, the terminal calculates the average of the CINRs of the transmit streams. For example, the terminal calculates the CINRs and the average CINR of the transmit streams based on Equation (1). Herein, the time required to calculate the average CINR may be fixed or adjustable.

In step 305, the terminal calculates and compares the CINR difference of the transmit streams with the first threshold.

When the CINR difference of the transmit streams is greater than the first threshold ($|CINR1-CINR2|>CINR_{th1}$), the terminal selects the diversity scheme as the multi-antenna transmission mode in step 313.

When the CINR difference of the transmit streams is smaller than or equal to the first threshold ($|CINR1-CINR2|\leq CINR_{th1}$), the terminal compares the average CINR of the transmit streams with the second threshold in step 307.

When the average CINR is smaller than or equal to the second threshold ($CINR_{AVR}\leq CINR_{th2}$), the terminal selects the diversity scheme as the multi-antenna transmission mode in step 313.

When the average CINR is greater than the second threshold ($CINR_{AVR}>CINR_{th2}$), the terminal selects the spatial multiplexing scheme as the multi-antenna transmission mode in step 309.

After selecting the multi-antenna transmission mode, the terminal feeds back the multi-antenna transmission mode to the transmitting end in step 311.

Next, the terminal finishes this process.

In this embodiment of the present invention, upon receiving the signal via the antennas, the terminal determines the multi-antenna transmission mode according to the characteristics of the transmit streams estimated using the receive signal. Alternatively, when receiving a multi-antenna transmission mode selection signal from the transmitting end as shown in FIG. 4, the terminal may determine the multi-antenna transmission mode according to the characteristics of the transmit streams estimated using the signal received on the antennas.

Figure 4:
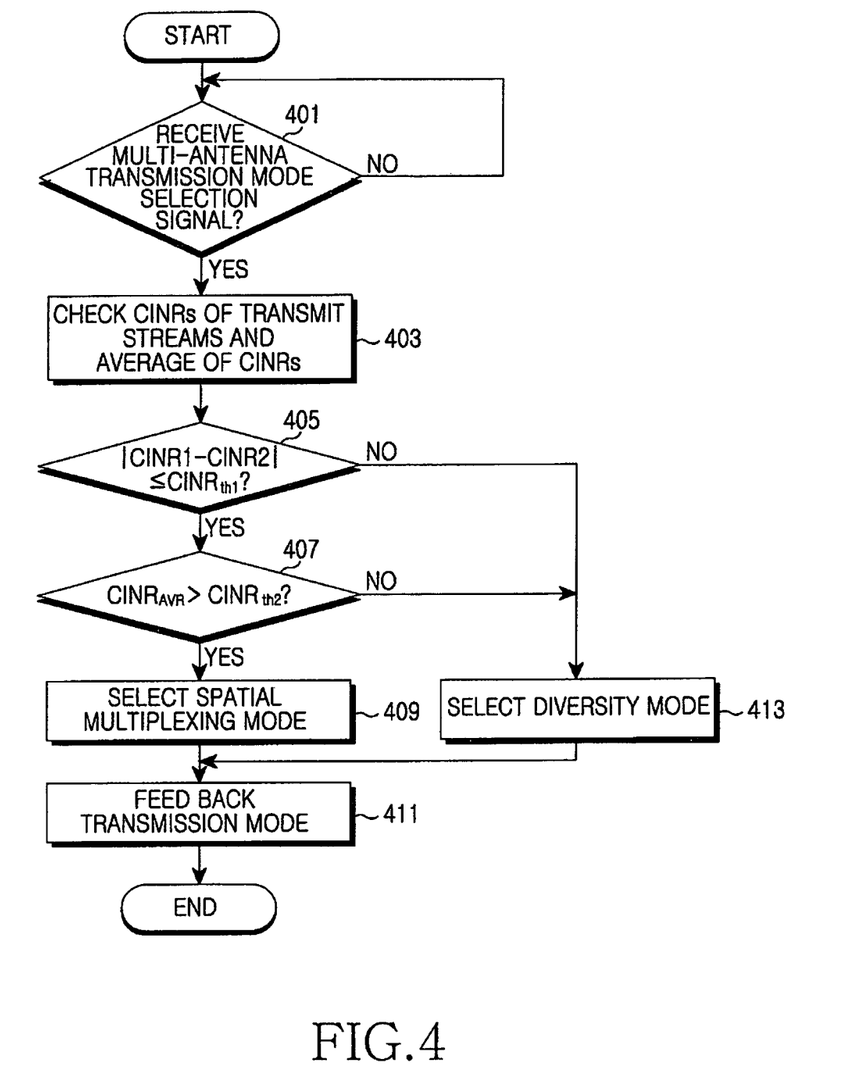
FIG. 4 is a flowchart of operations of the terminal in the multi-antenna system according to another embodiment of the present invention.

FIG. 4 is a flowchart of operations of the terminal in the multi-antenna system according to another embodiment of the present invention.

In step 401, the terminal checks whether a signal requesting to select the multi-antenna transmission mode is received from the transmitting end. Herein, the terminal receives the signal requesting to select the multi-antenna transmission mode through a fast feedback subheader or Channel Quality Indicator (CQI) Channel_Allocation_Information Element.

Receiving the signal requesting to select the multi-antenna transmission mode, the terminal measures the CINRs of the transmit streams using the signal received from the transmitting end in step 403. Also, the terminal calculates the average of the CINRs of the transmit streams. For example, the terminal calculates the CINRs and the average CINR of the transmit streams based on Equation 1. The time required to calculate the average CINR may be fixed or adjustable.

In step 405, the terminal calculates and compares the CINR difference of the transmit streams with the first threshold.

When the CINR difference of the transmit streams is greater than the first threshold ($|CINR1-CINR2|>CINR_{th1}$), the terminal selects the diversity scheme as the multi-antenna transmission mode in step 413.

When the CINR difference of the transmit streams is smaller than or equal to the first threshold ($|CINR1-CINR2|\leq CINR_{th1}$), the terminal compares the average CINR of the transmit streams with the second threshold in step 407.

When the average CINR is smaller than or equal to the second threshold ($CINR_{AVR}\leq CINR_{th2}$), the terminal selects the diversity scheme as the multi-antenna transmission mode in step 413.

When the average CINR is greater than the second threshold ($CINR_{AVR}>CINR_{th2}$), the terminal selects the spatial multiplexing scheme as the multi-antenna transmission mode in step 409.

After selecting the multi-antenna transmission mode, the terminal feeds back the multi-antenna transmission mode to the transmitting end in step 411.

Next, the terminal finishes this process.

In this embodiment of the present invention, the terminal determines the multi-antenna transmission mode using the CINR difference and the average CINR of the transmit streams. Alternatively, the terminal may determine the multi-antenna transmission mode merely using either the CINR difference or the average CINR of the transmit streams.

Meanwhile, to determine the transmission mode by considering the channel condition, the multi-antenna system takes into account the CINR of the multi-antenna transmission mode and a correlation between channels of the received signal. Herein, the CINR indicates the channel condition according to the multi-antenna transmission mode, and the correlation indicates the independence between the channels.

The capacity gain of the multi-antenna system varies depending on the channel condition and the multi-antenna transmission mode. That is, the multi-antenna system attains the different capacity gain depending on the channel condition in the multi-antenna transmission mode as shown in FIG. 5.

Figure 5:
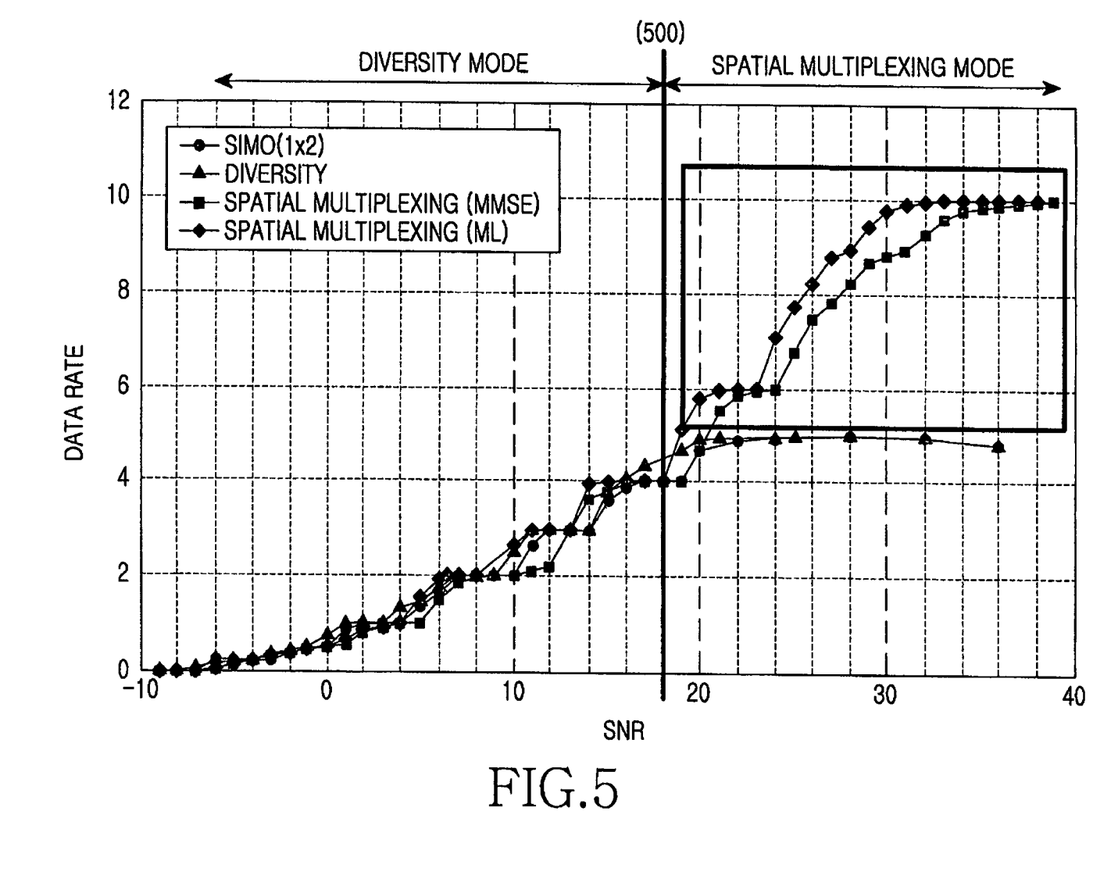
FIG. 5 is a graph of a data rate based on the CINR in the multi-antenna system according to an embodiment of the present invention.

FIG. 5 is a graph of a data rate based on the CINR in the multi-antenna system according to an embodiment of the present invention. FIG. 5 shows the graph of Hull curve, where the horizontal axis indicates the CINR and the vertical axis indicates the data rate based on the CINR.

When the CINR of the channel between the transmitting end and the receiving end is less than a threshold 500 as shown in FIG. 5, the multi-antenna system exhibits similar data rates regardless of the multi-antenna transmission mode. Accordingly, it is advantageous that the multi-antenna system increases the transmission reliability using the diversity scheme.

By contrast, when the CINR is greater than the threshold 500, the data rate in the spatial multiplexing transmission mode is higher than the data rates in a Single Input Single Output (SISO) mode and in the diversity transmission mode. Accordingly, it is advantageous that the multi-antenna system increases the data rate using the spatial multiplexing transmission mode.

As such, the multi-antenna system can determine the multi-antenna transmission mode according to the CINR of the multi-antenna transmission mode and the channel condition acquired from the correlation of the channels. Note that the CINR of the spatial multiplexing mode of the multi-antenna transmission modes is the same as the average CINR of the streams in Equation 1.

Figure 6:
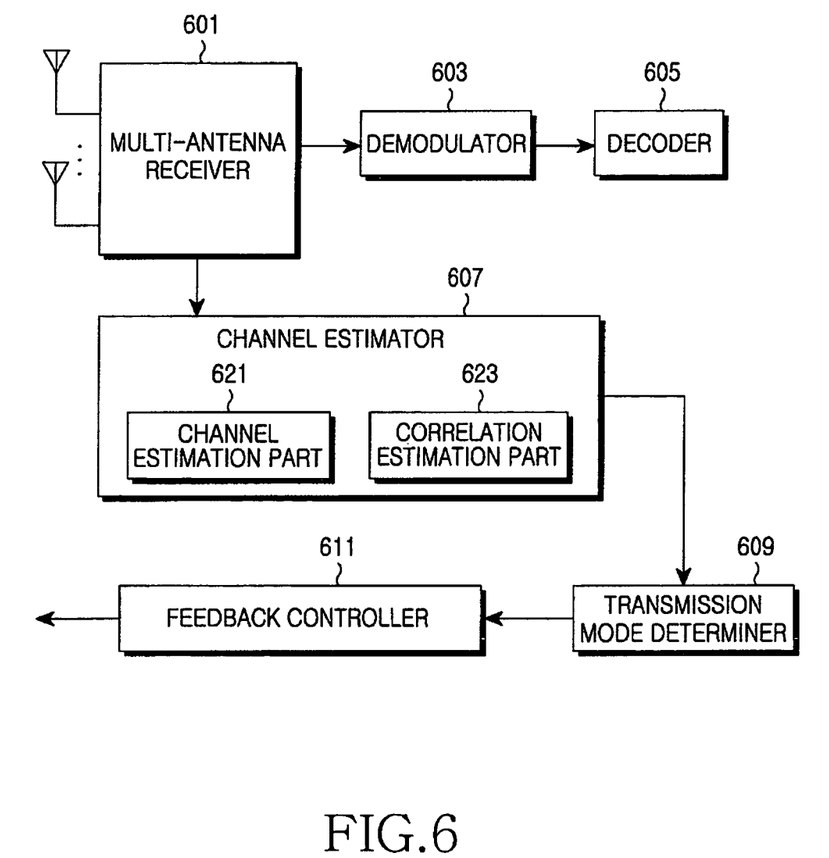
FIG. 6 is a block diagram of a terminal in the multi-antenna system according to another embodiment of the present invention.

FIG. 6 is a block diagram of a terminal in the multi-antenna system according to another embodiment of the present invention.

The terminal of FIG. 6 includes a multi-antenna receiver 601, a demodulator 603, a decoder 605, a channel estimator 607, a transmission mode determiner 609, and a feedback controller 611.

The multi-antenna receiver 601 detects receive information from a signal received over a plurality of antennas according to the multi-antenna transmission mode of the signal received from the transmitting end (e.g., a base station). For example, when the base station sends the signal in the diversity transmission mode, the multi-antenna receiver 601 detects received information using the diversity transmission mode. When the base station sends the signal in the spatial multiplexing transmission mode, the multi-antenna receiver 601 detects the received information using the spatial multiplexing transmission mode.

The demodulator 603 demodulates the received information output from the multi-antenna receiver 601 according to a corresponding modulation level (e.g., Modulation order Product code Rate (MPR)). The decoder 605 decodes the demodulated signal output from the demodulator 603 according to the corresponding modulation level.

The channel estimator 607 includes a channel estimation part 621 and a correlation estimation part 623.

The channel estimation part 621 calculates the CINR of the received signal using a preamble or a pilot signal of the received signal output from the multi-antenna receiver 601. The channel estimation part 621 estimates the CINR of the multi-antenna transmission mode used to send the signal from the transmitting end.

Figure 10:
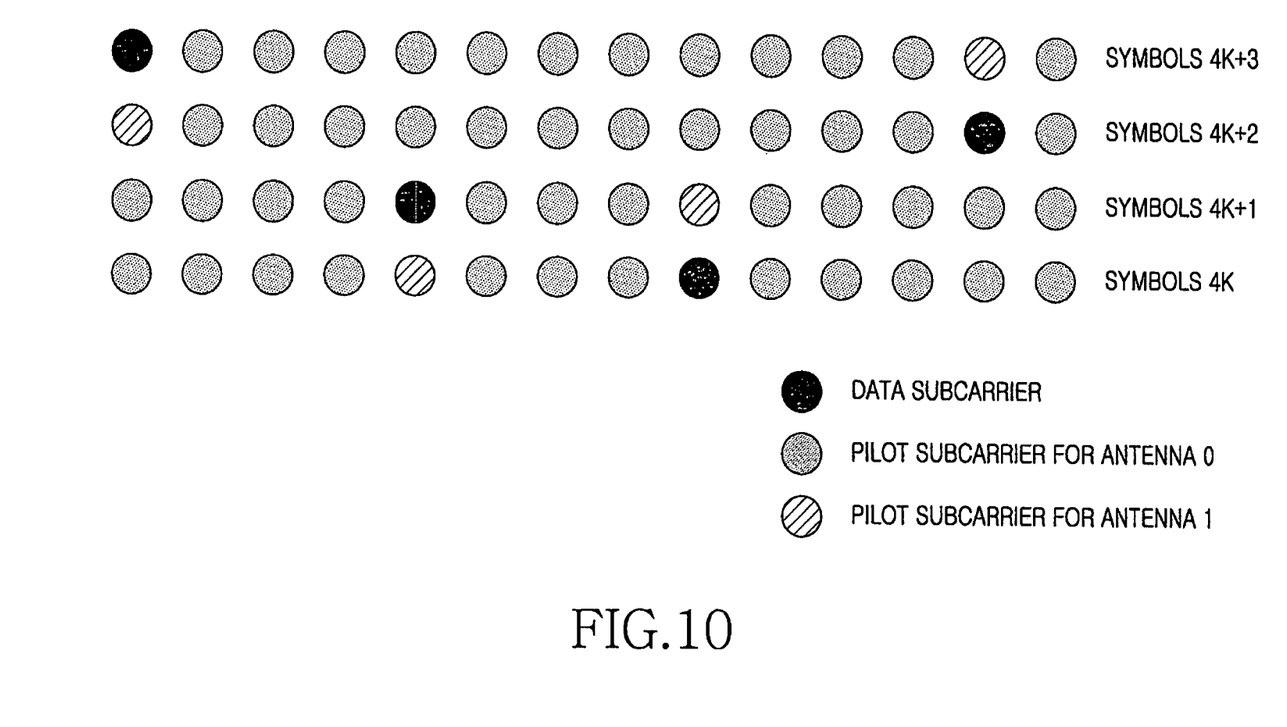
FIG. 10 is a diagram of a pilot signal of transmit and receiving antennas according to an embodiment of the present invention.

The correlation estimation part 623 calculates a correlation value of the channels between the transmitting antennas of the transmitting end and the receiving antennas of the terminal using the pilot signal of the received signal output from the multi-antenna receiver 601. Herein, the transmitting end of the multi-antenna system sends the pilot signal of the same structure regardless of the multi-antenna transmission modes. The transmitting end sends the pilot signal via each transmitting antenna as shown in FIG. 10.

The correlation estimation part 623 calculates the inter-channel correlation value using channel information acquired using the pilot signal of the receive signal based on Equation 2:

$$\text{Eigen\_Value\_Spread}(k) = \frac{\max(\text{abs}(EigenValue(H(k))))}{\min(\text{abs}(EigenValue(H(k))))}, \quad [\text{Eqn. 2}]$$

where $$H(k) = \begin{bmatrix} h_{11} & h_{21} \\ h_{12} & h_{22} \end{bmatrix}, k = \text{number of cluster.}$$

In Equation 2, Eigen_Value_Spread indicates the correlation between the channel, H(k) indicates the channel between the antennas of the transmitting end and the antennas of the receiving end, and $h_{ij}$ indicates the channel between the i-th transmitting antenna and the j-th receiving antenna.

Figure 11:
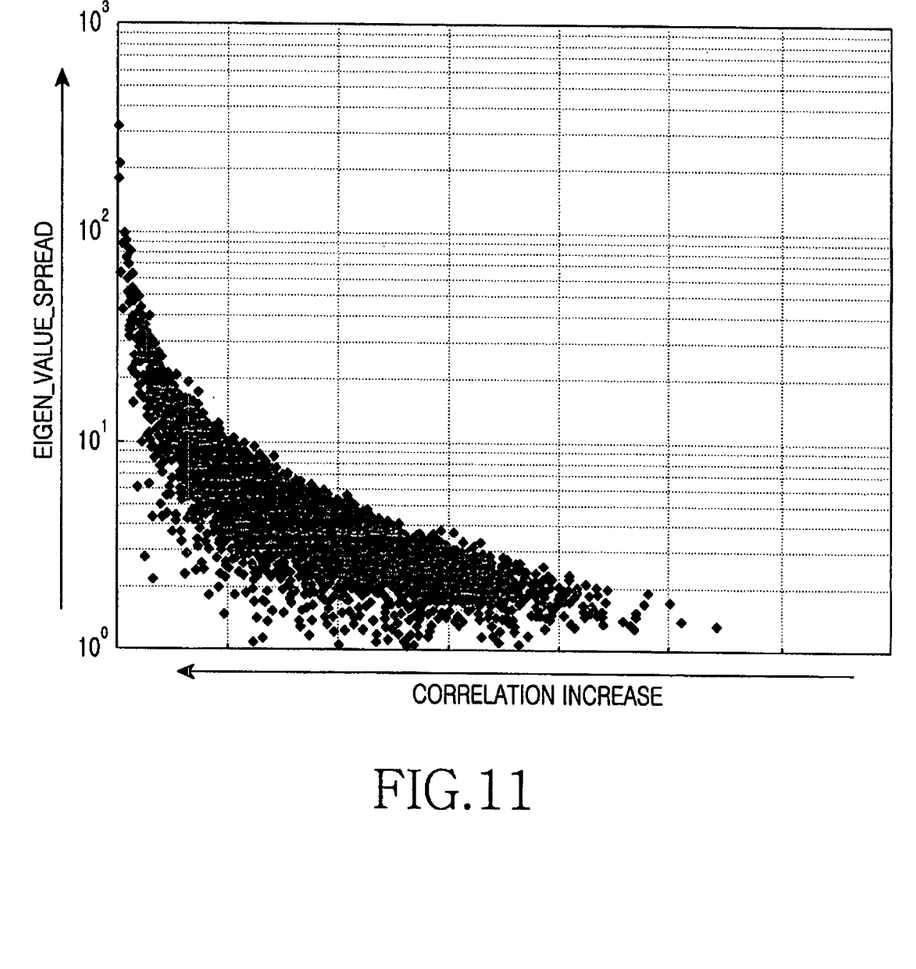
FIG. 11 is a graph of correlation values based on an eigenvalue spread in the multi-antenna system according to an embodiment of the present invention.

The correlation estimation part 623 confirms the inter-channel correlation value by calculating the eigenvalue spread based on Equation 2. As shown in FIG. 11, as the eigenvalue spread exceeds 1, the inter-channel correlation value increases.

The transmission mode determiner 609 determines the multi-antenna transmission mode to be requested to the transmitting end using the CINRs and the inter-channel correlation value provided from the channel estimator 607. For example, when the CINR is greater than the first threshold and the correlation value is smaller than or equal to the second threshold, the transmission mode determiner 609 selects the spatial multiplexing mode as the multi-antenna transmission mode. That is, when the CINR is greater than the first threshold, the transmission mode determiner 609 determines that the transmitting end uses the multi-antenna transmission mode adequate for the channel condition. When the inter-channel correlation is smaller than the second threshold, the transmission mode determiner 609 determines that the low similarity between the channels receiving the signal at the receiving end is not likely to affect the interference. Therefore, the transmission mode determiner 609 selects the spatial multiplexing scheme as the multi-antenna transmission mode.

By contrast, when the CINR is smaller than or equal to the first threshold, or when the correlation value is greater than the second threshold, the transmission mode determiner 609 selects the diversity transmission scheme as the multi-antenna transmission mode.

The feedback controller 611 feeds back the multi-antenna transmission mode determined at the transmission mode determiner 609 to the transmitting end.

FIG. 10 is a diagram of a pilot signal of transmit and receiving antennas according to an embodiment of the present invention. By way of example, a pilot structure of a cluster of an Institute of Electrical and Electronics Engineers (IEEE) 802.16e Partial Usage of Sub-Channels (PUSC) DownLink (DL) signal is illustrated.

The transmitting end of the multi-antenna system transmits the pilot signal using different pilot patterns on the antenna basis as shown in FIG. 10. Accordingly, in an environment where the channel difference between tones of the cluster is not so great, the channel values of the transmit and receiving antennas can be calculated using the pilot signal.

The correlation estimation part 623 can calculate the channel information to calculate the correlation value between the channels using the pilot signal of the receive signal.

FIG. 11 is a graph of correlation values based on the eigenvalue spread in the multi-antenna system according to an embodiment of the present invention.

In FIG. 11, as the eigenvalue spread is greater than 1, the inter-channel correlation value increases.

The eigenvalue 1, which is calculated at the correlation estimation part 623 based on Equation 2, signifies no correlation between the channels.

Now, a method for the receiving end to feed back the multi-antenna transmission mode is described. It is assumed that the receiving end is a terminal.

Figure 7:
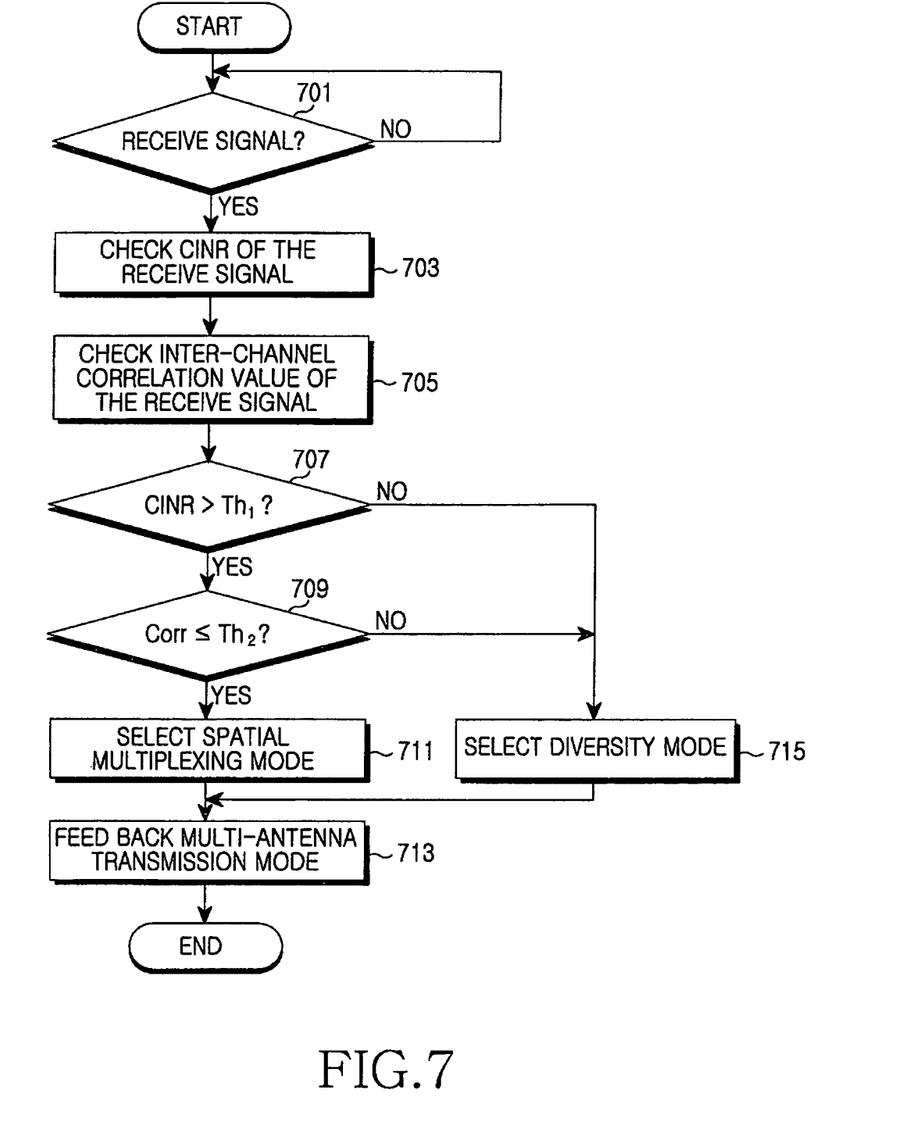
FIG. 7 is a flowchart of operations of the terminal in the multi-antenna system according to yet another embodiment of the present invention.

FIG. 7 is a flowchart of operations of the terminal in the multi-antenna system according to yet another embodiment of the present invention.

In step 701, the terminal checks whether a signal is received from the transmitting end over the plurality of the antennas.

Upon receiving the signal, the terminal checks the channel condition in the multi-antenna transmission mode of the transmitting end using the preamble or the pilot of the receive signal in step 703. For example, when the transmitting end uses the diversity transmission mode, the terminal calculates the CINR according to the diversity transmission mode using the preamble or the pilot of the receive signal. When the transmitting end uses the spatial multiplexing mode, the terminal calculates the CINR of the spatial multiplexing mode using the preamble or the pilot of the receive signal.

Next, the terminal checks the correlation value between the channels of the transmitting antennas and the receiving antennas using the channel information estimated using the pilot of the receive signal in step 705. The terminal checks the inter-channel correlation value by calculating the eigenvalue spread based on Equation 2.

In step 707, the terminal compares the CINR of the multi-antenna transmission mode with the first threshold.

When the CINR is smaller than or equal to the first threshold (CINR≦Th1), the terminal determines the bad channel condition and selects the diversity transmission mode as the diversity transmission mode to be requested to the transmitting end in step 715.

When the CINR is greater than the first threshold (CINR>Th1), the terminal compares the correlation value with the second threshold in step 709.

When the correlation value is greater than the second threshold (Corr>Th2), the terminal selects the diversity transmission mode as the multi-antenna transmission mode to be requested to the transmitting end because of the high inter-channel correlation in step 715.

When the correlation value is smaller than or equal to the second threshold (Corr≦Th2), the terminal selects the spatial multiplexing scheme as the multi-antenna transmission mode to be requested to the transmitting end in step 711.

In step 713, the terminal sends the selected multi-antenna transmission mode to the transmitting end.

Next, the terminal finishes this process.

Figure 8:
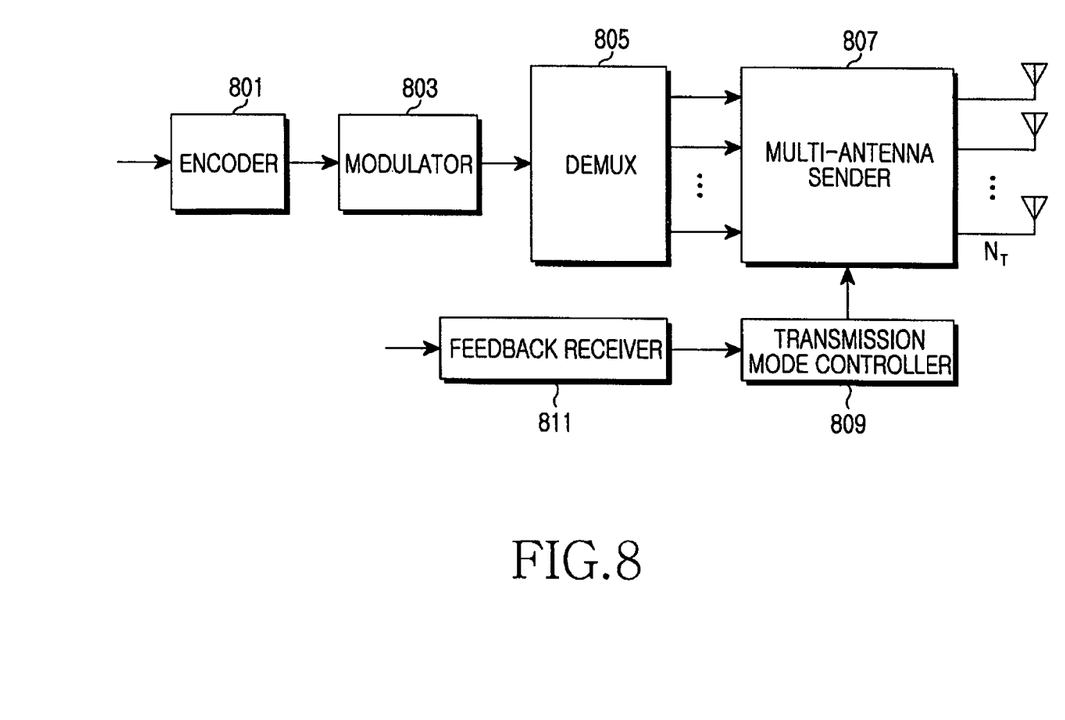
FIG. 8 is a block diagram of a base station in the multi-antenna system according to an embodiment of the present invention.

As above, when the receiving end selects and feeds back the multi-antenna transmission mode according to the channel environment, the transmitting end is constituted as shown in FIG. 8 so as to send the signal in the multi-antenna transmission mode as requested by the receiving end. Hereinafter, it is assumed that the transmitting end is a base station.

FIG. 8 is a block diagram of a base station in the multi-antenna system according to an embodiment of the present invention.

The base station of FIG. 8 includes an encoder 801, a modulator 803, a demultiplexer (DEMUX) 805, a multi-antenna sender 807, a transmission mode controller 809, and a feedback receiver 811.

The encoder 801 codes data to be sent to the receiving end according to a corresponding modulation level (e.g., MCS level or MPR). The modulator 803 modulates the signal output from the encoder 801 at a corresponding modulation level.

The DEMUX 805 demultiplexes the complex signals output from the modulator 803 to send them over the NT-ary transmitting antennas.

The multi-antenna sender 807 sends the signals output from the DEMUX 805 to the receiving end over the transmitting antennas in the determined multi-antenna transmission mode under the control of the transmission mode controller 809.

The transmission mode controller 809 controls the multi-antenna transmission mode of the multi-antenna sender 807 depending on the multi-antenna transmission mode provided from the feedback receiver 811.

The feedback receiver 811 confirms the multi-antenna transmission mode determined based on the channel condition of the receiving end from the feedback signal received from the receiving end, and provides the confirmed multi-antenna transmission mode to the transmission mode controller 809.

Figure 9:
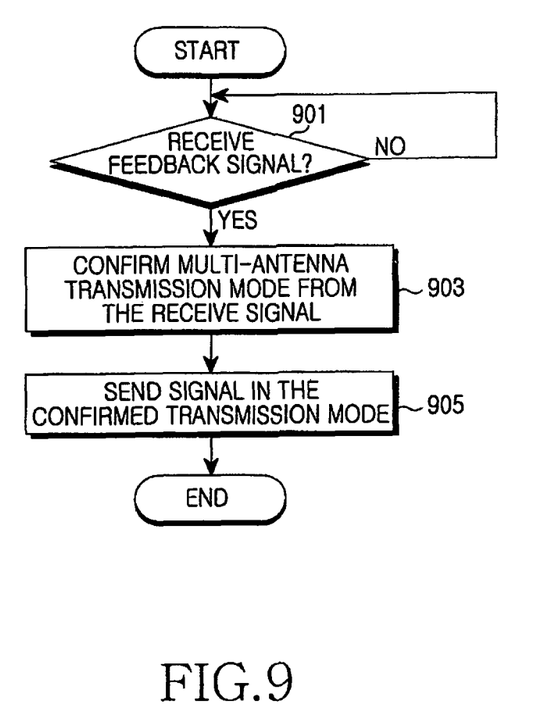
FIG. 9 is a flowchart of operations of the base station in the multi-antenna system according to an embodiment of the present invention.

The base station constituted as above transmits the signal in the multi-antenna transmission mode determined at the receiving end in the process of FIG. 9.

FIG. 9 is a flowchart of operations of the base station in the multi-antenna system according to an embodiment of the present invention.

In step 901, the base station checks whether the feedback signal is received from the receiving end.

Upon receiving the feedback signal, the base station confirms the multi-antenna transmission mode selected by the receiving end by considering the channel environment, from the feedback signal in step 903.

In step 905, the base station transmits the signal to the receiving end in the multi-antenna transmission mode selected by the receiving end. For example, when the receiving end requests the diversity transmission mode, the base station transmits the signal to the receiving end in the diversity transmission mode. When the receiving end requests the spatial multiplexing transmission mode, the base station transmits the signal to the receiving end in the spatial multiplexing transmission mode.

Next, the base station finishes the process.

As set forth above, the multi-antenna system selectively utilizes the transmission modes depending on the channel environment. Therefore, the loss of the system capacity gain can be reduced and the capacity gain of the system can be increased.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for selecting a transmission mode in a multi-antenna system, the method comprising:
    determining a channel characteristic of each transmit stream received from a transmitter;
    determining a difference between the channel characteristic of a first transmit stream and the channel characteristic of a second transmit stream by comparing the channel characteristic of the first transmit stream and the channel characteristic of the second transmit stream; and
    determining either a spatial multiplexing mode or a diversity mode as a multi-antenna transmission mode by comparing the determined difference of the channel characteristics with a first threshold.

2. The method of claim 1, wherein the channel characteristic comprises one of carrier to interference and noise ratios of transmit streams of the transmitter, an average carrier to interference and noise ratio of the transmit streams, a carrier to interference and noise ratio in the multi-antenna transmission mode used at the transmitter to send the signal, and a correlation value between channels of the received signal.

3. The method of claim 1, further comprising:
    determining whether a multi-antenna transmission mode selection request signal is received from the transmitter,
    wherein the channel characteristic is determined when the multi-antenna transmission mode selection request signal is received.

4. The method of claim 3, wherein the multi-antenna transmission mode selection request signal is one of a fast feedback subheader and a Channel Quality Indicator (CQI)Channel_Allocation_Information Element.

5. The method of claim 1, wherein determining the channel characteristic comprises:
    determining carrier to interference and noise ratios of each transmit stream received from the transmitter.

6. The method of claim 5, wherein either the spatial multiplexing mode or the diversity mode as the multi-antenna transmission mode comprises:
    determining the spatial multiplexing mode as the multi-antenna transmission mode when the difference between the carrier to interference and noise ratios of the first transmit stream and the carrier to interference and noise ratios of the second transmit stream is smaller than the first threshold.

7. The method of claim 6, further comprising:
    determining the diversity mode as the multi-antenna transmission mode when the difference between the carrier to interference and noise ratios of the first transmit stream and the carrier to interference and noise ratios of the second transmit stream is greater than the first threshold.

8. The method of claim 1, wherein determining the channel characteristic comprises:
    determining carrier to interference and noise ratios of each transmit stream received from the transmitter; and
    determining an average of the carrier to interference and noise ratios.

9. The method of claim 8, wherein determining the difference of the channel characteristics comprises:
    determining a difference between the carrier to interference and noise ratio of the first transmit stream and the carrier to interference and noise ratio of the second transmit stream by comparing the carrier to interference and noise ratio of the first transmit stream and the carrier to interference and noise ratio of the second transmit stream; and
    comparing the average of the carrier to interference and noise ratios of the transmit streams with a second threshold when the determined difference of the carrier to interference and noise ratios is smaller than a first threshold.

10. The method of claim 9, wherein determining either a spatial multiplexing mode or a diversity mode as a multi-antenna transmission mode comprises:
    determining the spatial multiplexing mode as the multi-antenna transmission mode of the transmitter when the determined difference of the carrier to interference and noise ratios is smaller than the first threshold and when the average of the carrier to interference and noise ratios of the transmit streams is greater than the second threshold; and
    determining a diversity mode of the transmitter as the multi-antenna transmission mode when the determined difference of the carrier to interference and noise ratios is greater than the first threshold or when the average of the carrier to interference and noise ratios of the transmit streams is smaller than the second threshold.

11. The method of claim 1, further comprising:
    sending the determined multi-antenna transmission mode to the transmitter.

12. A method for selecting a transmission mode in a multi-antenna system, the method comprising:
    determining a carrier to interference and noise ratio in relation with a multi-antenna transmission mode used by a transmitter to send a signal;
    determining a correlation value between channels of a received signal;
    comparing a carrier to interference and noise ratio of the multi-antenna transmission mode with a first threshold;
    comparing a correlation value of the channels with a second threshold when the carrier to interference and noise ratio of the multi-antenna transmission mode is greater than the first threshold; and
    determining a spatial multiplexing scheme as the multi-antenna transmission mode when the inter-channel correlation value is smaller than the second threshold.

13. The method of claim 12, further comprising:
    determining a diversity scheme as the multi-antenna transmission mode of the transmitter when the carrier to interference and noise ratio of the multi-antenna transmission mode is smaller than the first threshold or when the inter-channel correlation value is greater than the second threshold.

14. The method of claim 12, wherein determining the inter-channel correlation value comprises:
    estimating channels using the received signal; and
    determining the inter-channel correlation value by estimating an eigenvalue spread of the estimated channels.

15. An apparatus for selecting a transmission mode in a multi-antenna system, the apparatus comprising:
    a receiver configured to receive a signal over at least two antennas;
    a channel estimator configured to determine a channel characteristic of each transmit stream received from a transmitter; and
    a transmission mode determiner configured to:
        determine a difference between the channel characteristic of a first transmit stream and the channel characteristic of a second transmit stream by comparing the channel characteristic of the first transmit stream and the channel characteristic of the second transmit stream, and determine either a spatial multiplexing mode or a diversity mode as a multi-antenna transmission mode by comparing the determined difference of the channel characteristics with a first threshold.

16. The apparatus of claim 15, wherein the channel estimator estimates one of carrier to interference and noise ratios (CINRs) of transmit streams of the transmitter, an average carrier to interference and noise ratio of the transmit streams, a carrier to interference and noise ratio in the multi-antenna transmission mode used at the transmitter to send the signal, and a correlation value between channels of the received signal.

17. The apparatus of claim 15, wherein the channel estimator determines the channel characteristic when a multi-antenna transmission mode selection request signal is received from the transmitter through the receiver.

18. The apparatus of claim 17, wherein the receiver receives the multi-antenna transmission mode selection request signal which includes one of a fast feedback subheader and a Channel Quality Indicator (CQI) Channel_Allocation_Information Element.

19. The apparatus of claim 15, wherein the channel estimator determines carrier to interference and noise ratios of the transmit streams.

20. The apparatus of claim 19, wherein the transmission mode determiner determines the spatial multiplexing mode as the multi-antenna transmission mode when the difference between the carrier to interference and noise ratios of the first transmit stream and the carrier to interference and noise ratios of the second transmit stream is smaller than the first threshold, and the transmission mode determiner determines the diversity mode as the multi-antenna transmission mode when the difference between the carrier to interference and noise ratios of the first transmit stream and the carrier to interference and noise ratios of the second transmit stream is greater than the first threshold.

21. The apparatus of claim 15, wherein the channel estimator determines a carrier to interference and noise ratio of the each transmit stream and an average of the carrier to interference and noise ratios of the transmit streams.

22. The apparatus of claim 21, wherein the transmission mode determiner determines the spatial multiplexing mode as the multi-antenna transmission mode when the difference between the carrier to interference and noise ratios of the first transmit stream and the carrier to interference and noise ratios of the second transmit stream is smaller than a first threshold and the average of the carrier to interference and noise ratios of the transmit streams is greater than a second threshold, and wherein the transmission mode determiner determines the diversity mode as the multi-antenna transmission mode when the difference between the carrier to interference and noise ratios of the first transmit stream and the carrier to interference and noise ratios of the second transmit stream is greater than the first threshold or the average of the carrier to interference and noise ratios of the transmit streams is smaller than the second threshold.

23. The apparatus of claim 15, further comprising:
a sender configured to send the determined multi-antenna transmission mode to the transmitter over at least two antennas.

24. An apparatus for selecting a transmission mode in a multi-antenna system, the apparatus comprising:
a receiver configured to receive a signal over at least two antennas;
a channel estimator configured to determine a carrier to interference and noise ratio of the multi-antenna transmission mode used by the transmitter to send a signal;
a correlation part configured to determine a correlation value between channels of the signal; and
a transmission mode determiner configured to:
determine a spatial multiplexing mode as the multi-antenna transmission mode when the carrier to interference and noise ratio of the multi-antenna transmission mode used by the transmitter to send the signal, which is determined at the channel estimator, is greater than a first threshold and the inter-channel correlation value is smaller than a second threshold, and
determine a diversity mode as the multi-antenna transmission mode when the carrier to interference and noise ratio of the multi-antenna transmission mode is smaller than the first threshold or the inter-channel correlation value is greater than the second threshold.

25. The apparatus of claim 24, wherein the correlation part estimates channels using the received signal, and
the correlation part determines the inter-channel correlation value by estimating an eigenvalue spread of the estimated channels.

* * * * *